Oct. 15, 1940.  F. A. ARBOGAST  2,217,977

MACHINE FOR MAKING FRINGE

Filed Nov. 25, 1939  2 Sheets-Sheet 1

INVENTOR
Fred A. Arbogast

BY
Ralph Barrow
ATTORNEY

Oct. 15, 1940.  F. A. ARBOGAST  2,217,977
MACHINE FOR MAKING FRINGE
Filed Nov. 25, 1939  2 Sheets-Sheet 2

INVENTOR
Fred A. Arbogast

BY
J. Ralph Barrow
ATTORNEY

Patented Oct. 15, 1940

2,217,977

UNITED STATES PATENT OFFICE 2,217,977

MACHINE FOR MAKING FRINGE

Fred A. Arbogast, Akron, Ohio

Application November 25, 1939, Serial No. 306,136

6 Claims. (Cl. 164—28)

This invention relates to a machine for making fringe and in particular relates to a method and apparatus for making fringe for use in the manufacture of artificial fish bait or the like.

The general object of the invention is to provide a simple method and apparatus for manufacturing fringe of the character described, with a minimum of waste material.

Another object of the invention is to provide an improved rotary cutter for uniformly cutting continuous strips of fringe having relatively narrow strands arranged in a direction substantially normal to the marginal portions of the strip.

Another object of the invention is to provide apparatus for cutting continuous strips of fringe material adapted to be quickly severed to form pieces of fringe of predetermined lengths.

These and other objects of the invention will be manifest from the following brief description and the accompanying drawings.

Figure 1:
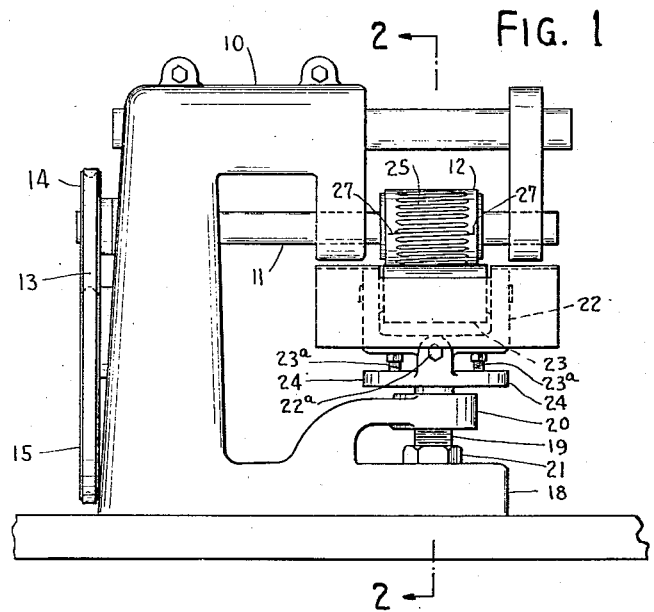
Figure 1 is a front elevation of a machine embodying the invention.
Figure 2:
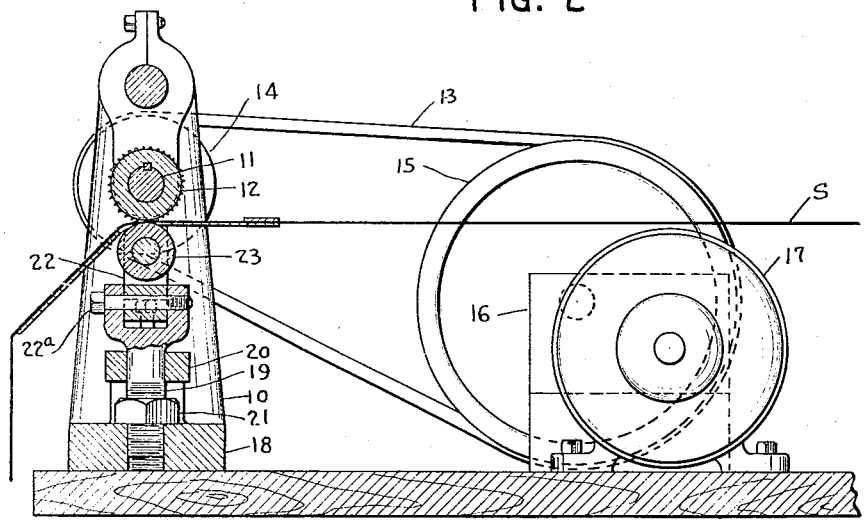
Figure 2 is a cross-section taken on line 2—2 of Figure 1.
Figure 3:
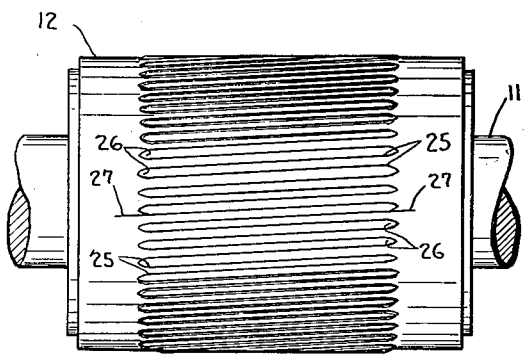
Figure 3 is an enlarged detail view of the cutter roll thereof.

Referring to the drawings, the numeral 10 designates a frame for rotatably supporting a horizontal shaft 11, having cutter roll 12 keyed thereon. Shaft 11 may be driven, through a belt 13 extending between a pulley 14 on the shaft 11 and a pulley 15 on a speed-reducer 16, by means of a motor 17.

Threaded for vertical adjustment in a base plate 18 of frame 10 may be a supporting post 19 which extends upwardly through an aperture in a guide arm 20 integral with the base plate 18, a nut 21 being threaded on post 19 for engagement with the base plate to lock the post in adjusted position. Pivoted at 22ª on upper end of post 19 is a U-shaped bracket 22 for rotatably supporting a pressure roll 23 in engagement with the cutter roll 12. Studs 23ª, 23ª threaded in lugs 24, 24 extending from opposite sides of post 19, are adapted to be adjusted in opposing directions against the under side of bracket 22 to swing the bracket on its pivot 22ª and thereby equalize the pressure of roller 23 along the lower surface of the cutter roll.

Figure 6:
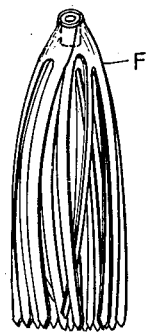
Figure 6 illustrates the manner of forming a length of fringe into a tassel or "buck-tail."

In the manufacture of continuous strips of fringe for the present purposes it is desirable that the materials preferably are formed with relatively narrow strands extending normal to the marginal portion of the strip so that when the lengths of the fringe are formed into tassels or "buck-tails" for use as artificial bait, as shown in Figure 6, the strands will all lie in a direction longitudinally of the finished tassel. If the cutting blades of the cutter roll are arranged axially of the rolls to cut the strands in the above manner, the result will be a series of jarring impacts between the blades of the cutter roll and the peripheral surface of the pressure roll. This causes the knives to cut unevenly and results in a great deal of waste material when the strands are separated after the cutting operation.

To overcome the above difficulty, cutter blades 25, 25, are arranged on cutter roll 12 to form a series of reversing loops 26, 26, the sides of which are substantially co-extensive with the line of contact between the cutter roll and the pressure roll, but being arranged at a sufficient angle to said line of contact that as the cutter roll is rotated against the pressure roll to cut sheet material, such as sheet rubber 5, progressively fed between the rolls, the blades 25 will progressively engage the pressure roll 23. In this manner uniform cutting of said material may be effectively accomplished without having the loops extend at any substantial angle from the normal.

Figure 4:
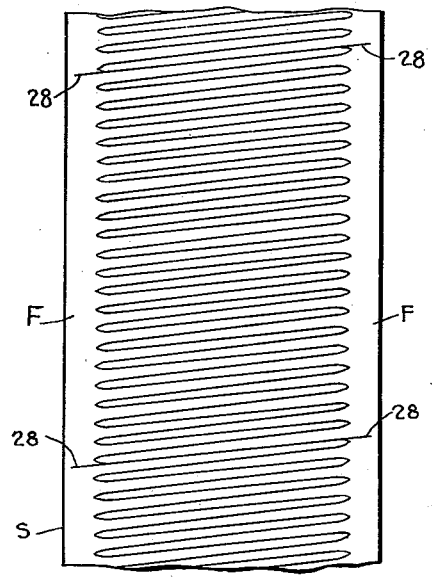
Figure 4 is a fragmentary view illustrating the manner in which continuous sheet material is cut into fringe material.

At circumferentially spaced intervals on cutter roll 12 may be pairs of blades 27, 27 arranged to cut or nick the strip of material S from oppositely disposed ends of adjacent loops 26 to points just short of the marginal edges of the material S, as indicated at 28, 28 in Figure 4. This facilitates separating the continuous strips of material into predetermined lengths after the cutting operation, as will be described.

Figure 5:
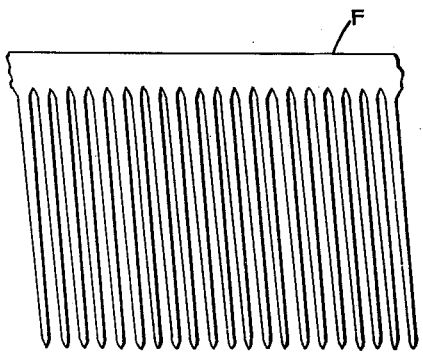
Figure 5 is a view of a piece of fringe of predetermined length for forming an artificial bait tassle or "buck-tail."

The material resulting from the apparatus described is shown in Figure 4. As this material S emanates from between the cooperating rolls 12 and 23, an operator may readily separate the material along the cuts made by the plates 25 to form two continuous strips of fringe F. F. These strips may then be severed at the nicked portions 28 to separate the same into pieces of fringe of predetermined length, as shown in Figure 5, for forming the pieces into tassels or "bucktails," as shown in Figure 6, for attachment to artificial bait bodies in a known manner. When the fringe is thus formed into a tassel the strands, being arranged at angles relatively close to normal, will extend in a direction substantially longitudinally of the tassel (see Figure 6).

Modifications of the invention may be resorted to without departing from the spirit thereof or the scope of the appended claims.

What is claimed is:

1. A machine for cutting fringe from continuous sheet material comprising a cutter roll, and a pressure roll engaging said cutter roll, said cutter roll having blades thereon formed and arranged to cut a series of reversing loops between the marginal portions of a continuous strip of sheet material fed between said cutter and pressure rolls, the axially extending portions of said blades being arranged across the periphery of the cutter roll at angles to the line of contact between said cutter and pressure rolls so as to progressively to engage said material on said pressure roll uniformly to cut the material into separable strips of fringe material having strands thereon, the angles of said blades being relatively slight so that said strands will extend substantially normal to the edges of the strip.

2. A machine for cutting fringe from continuous sheet material comprising a cutter roll, and a pressure roll engaging said cutter roll, said cutter roll having blades thereon formed and arranged to cut a series of reversing loops between the marginal portions of a continuous strip of sheet material fed between said cutter and pressure rolls, the axially extending portions of said blades being arranged across the periphery of the cutter roll at angles to the line of contact between said cutter and pressure rolls so as progressively to engage said material on said pressure roll uniformly to cut the material into separable strips of fringe material having strands thereon, the angles of said blades being relatively slight so that said strands will extend substantially normal to the edges of the strip, said cutter roll having means thereon for weakening said material at spaced points along the marginal portions thereof, whereby said separable strips may be severed to form pieces of fringe of predetermined length.

3. A method of making lengths of fringe from thin, flexible, elastic material, which comprises cutting a series of reversing loops between the marginal portions of a continuous strip of sheet material, weakening said material at spaced points along the marginal portions thereof, severing the strip along said reversing loops to provide separate strips of fringe, and severing the marginal portions of said separated strips at said weakened points to provide pieces of fringe of predetermined length.

4. A method of making fringe which comprises cutting a continuous strip of thin flexible elastic material in a rotary cutter, said cutter having substantially parallel angularly extending blades for forming a series of reversing loops between the marginal portions of the material, the engles of said blades being relatively slight so that said loops will extend substantially normal to said marginal portions, and severing said strip along said reversing loops to provide separate strips of fringe.

5. A method of making fringe which comprises cutting a continuous strip of thin flexible elastic material in a cutter, said cutter having substantially parallel angularly extending blades for forming a series of reversing loops between the marginal portions of the material, the angles of said blades being relatively slight so that said loops will extend substantially normal to said marginal portions, weakening said material at spaced points along the marginal portions thereof, severing said strip along said reversing loops to provide separate strips of fringe having strands extending substantially normal to the marginal portions thereof, and severing the marginal portions of said separated strips at said weakened points to provide pieces of fringe of predetermined length.

6. A machine for cutting fringe from continuous sheet material comprising a cutter roll, and a pressure roll engaging said cutter roll, said cutter roll having blades thereon arranged to make a series of substantially parallel cuts in a continuous strip of sheet material fed between said cutter and pressure rolls, the blades of said cutter roll being arranged diagonally across the periphery of said cutter roll progressively to engage said material on said pressure roll uniformly to cut the material into strip fringe having strands at a slight angle from the normal.

FRED A. ARBOGAST.